(12) United States Patent
Haidt (10) Patent No.: US 12,292,129 B2
(45) Date of Patent: May 6, 2025

(54) DIAPHRAGM AND DIAPHRAGM VALVE

(71) Applicant: GEMÜ Gebr. Müller Apparatebau Gmbh & Co. Kommanditgesellschaft, Ingelfingen (DE)

(72) Inventor: Harald Haidt, Öhringen (DE)

(73) Assignee: GEMÜ Gebr. Müller Apparatebau Gmbh & Co. Kommanditgesellschaft, Ingelfingen (DE)

( * ) Notice: Subject to any disclaimer, the term of this patent is extended or adjusted under 35 U.S.C. 154(b) by 147 days.

(21) Appl. No.: 17/792,479

(22) PCT Filed: Dec. 1, 2020

(86) PCT No.: PCT/EP2020/084149
§ 371 (c)(1),
(2) Date: Jul. 13, 2022

(87) PCT Pub. No.: WO2021/144060
PCT Pub. Date: Jul. 22, 2021

(65) Prior Publication Data
US 2023/0058255 A1    Feb. 23, 2023

(30) Foreign Application Priority Data

Jan. 14, 2020 (DE) ............... 10 2020 100 744.2
Jan. 14, 2020 (DE) ............... 10 2020 100 745.0

(51) Int. Cl.
*F16K 27/12* (2006.01)
*F16K 7/12* (2006.01)
(Continued)

(52) U.S. Cl.
CPC ............ *F16K 27/0236* (2013.01); *F16K 7/12* (2013.01); *F16K 7/17* (2013.01)

(58) Field of Classification Search
CPC ...... F16K 27/0236; F16K 7/123; F16K 7/126; F16K 7/12; F16K 7/17
(Continued)

(56) References Cited

U.S. PATENT DOCUMENTS 1,771,410 A * 7/1930 Landis ................. F16K 7/16
137/625.27
1,939,911 A * 12/1933 McCune ............. B60T 17/043
251/335.2
(Continued)

FOREIGN PATENT DOCUMENTS

WO        2013179739 A1    12/2013

OTHER PUBLICATIONS

Non-translated EP Office Action, dated Mar. 7, 2023. pp. 1-9.
(Continued)

*Primary Examiner* — Craig J Price
(74) *Attorney, Agent, or Firm* — BOND, SCHOENECK & KING, PLLC; George R. McGuire (57) ABSTRACT

The invention relates to a diaphragm for a diaphragm valve. The diaphragm has a functional region and a fastening portion, which surrounds the functional region. In a relaxed state, the functional region includes a central portion, which protrudes on a wet side of the diaphragm; —a lateral portion, which protrudes on a dry side of the diaphragm, the lateral portion being curved, at least in parts, toward the dry side of the diaphragm; and an intermediate portion, which is arranged between the central portion and the lateral portion and is curved, at least in parts, toward the wet side of the diaphragm.

5 Claims, 7 Drawing Sheets

(51) Int. Cl.
*F16K 27/02* (2006.01)
*F16K 7/17* (2006.01)

(58) Field of Classification Search
USPC .......................................................... 251/331
See application file for complete search history.

(56) References Cited

U.S. PATENT DOCUMENTS

| | | | | |
|---|---|---|---|---|
| 2,705,124 A * | 3/1955 | Price | ....................... | F16K 7/123 |
| | | | | 251/266 |
| 2,716,017 A | 8/1955 | Linkler | | |
| 2,752,936 A * | 7/1956 | Cantalupo | ............... | F16K 47/02 |
| | | | | 137/434 |
| 2,963,266 A * | 12/1960 | Boteler | ................... | F16K 7/123 |
| | | | | 251/331 |
| 2,978,763 A * | 4/1961 | Loepsinger | ............. | F16K 7/126 |
| | | | | 264/227 |
| 2,988,322 A * | 6/1961 | Anderson | ............... | F16K 7/126 |
| | | | | 251/331 |
| 3,011,758 A | 12/1961 | Mcfarland | | |
| 3,020,020 A * | 2/1962 | Boteler | ................... | F16K 7/123 |
| | | | | 92/99 |
| 3,310,279 A * | 3/1967 | Boteler | ................... | F16K 7/123 |
| | | | | 251/331 |
| 3,310,280 A * | 3/1967 | Boteler | ................... | F16K 7/123 |
| | | | | 251/331 |
| 4,014,514 A * | 3/1977 | Priese | ....................... | F16K 7/16 |
| | | | | 251/285 |
| 5,217,043 A * | 6/1993 | Novakovic | ............. | F16K 41/10 |
| | | | | 137/460 |
| 5,529,280 A * | 6/1996 | Satoh | ........................ | F16K 7/17 |
| | | | | 251/61.1 |
| 6,505,814 B1 * | 1/2003 | Satou | .................... | F16K 31/122 |
| | | | | 137/863 |
| 6,688,577 B2 * | 2/2004 | Abbott | .................. | F16K 31/404 |
| | | | | 251/30.02 |
| 6,752,376 B1 * | 6/2004 | Satou | ....................... | F16K 7/123 |
| | | | | 251/63 |
| 7,201,187 B2 * | 4/2007 | Irwin | .................... | F16K 31/365 |
| | | | | 251/210 |
| 7,364,132 B2 * | 4/2008 | Browne | ..................... | F16K 7/16 |
| | | | | 251/366 |
| 8,118,278 B2 * | 2/2012 | Hays | ......................... | F16K 7/12 |
| | | | | 251/333 |
| 8,235,352 B2 * | 8/2012 | Irwin | .................... | F16K 31/402 |
| | | | | 251/30.01 |
| 8,714,517 B2 * | 5/2014 | Anagnos | ............. | F16K 27/0236 |
| | | | | 251/61.3 |
| 8,740,177 B2 * | 6/2014 | Walker | ...................... | F16K 7/17 |
| | | | | 251/30.01 |
| 9,157,534 B2 * | 10/2015 | Matalon | ................... | F16K 7/126 |
| 9,322,482 B2 * | 4/2016 | Matalon | ................... | F16K 7/126 |
| 9,322,488 B2 * | 4/2016 | Imai | ......................... | F16K 7/17 |
| 9,470,322 B2 * | 10/2016 | Wolpert | ............. | F16K 27/0236 |
| 9,638,346 B2 * | 5/2017 | Tsai | ...................... | F16K 31/126 |
| 9,803,755 B2 * | 10/2017 | Weingarten | ............... | F16K 7/17 |
| 9,816,621 B2 * | 11/2017 | Hasunuma | ............. | F16K 21/02 |
| 10,337,641 B2 * | 7/2019 | Ye | ........................ | F16K 31/145 |
| 10,774,940 B2 * | 9/2020 | Naor | ....................... | F16K 7/126 |
| 10,871,241 B2 * | 12/2020 | Loeber | ................ | F16K 31/1225 |
| 11,788,641 B1 * | 10/2023 | Hah | ....................... | F16K 27/029 |
| | | | | 251/36 |
| 11,927,280 B2 * | 3/2024 | Suzuki | ..................... | F16K 7/123 |
| 2002/0056826 A1 * | 5/2002 | Tripoli | ..................... | F16K 7/123 |
| | | | | 251/331 |
| 2004/0218020 A1 * | 11/2004 | Shibata | ................. | B41J 2/17596 |
| | | | | 347/85 |
| 2006/0081807 A1 * | 4/2006 | Browne | ................ | F16K 31/122 |
| | | | | 251/331 |
| 2010/0140524 A1 | 6/2010 | Hays | | |
| 2010/0171059 A1 * | 7/2010 | Kourogi | ................. | C08L 51/04 |
| | | | | 251/301 |
| 2011/0094609 A1 * | 4/2011 | Schroder | ................... | F16K 7/12 |
| | | | | 137/560 |
| 2014/0077108 A1 | 3/2014 | Ringer et al. | | |
| 2015/0129790 A1 | 5/2015 | Südel et al. | | |
| 2015/0167853 A1 * | 6/2015 | Obara | ......................... | F16J 3/02 |
| | | | | 251/331 |
| 2015/0219233 A1 | 8/2015 | Ringer | | |
| 2016/0161009 A1 | 6/2016 | Tsai | | |
| 2021/0372533 A1 * | 12/2021 | Stern | .................... | F16K 27/0236 |

OTHER PUBLICATIONS

Search Report issued by GPTO, pp. 1-7.
International Search Report and Written Opinion, PCT/EP2020/084149. pp. 1-11. Mailing date of Search Report, Feb. 26, 2021.

* cited by examiner

DIAPHRAGM AND DIAPHRAGM VALVE

CROSS-REFERENCE TO RELATED APPLICATION(S)

This application is the U.S. National Phase application of PCT Application Number PCT/EP2020/084149, filed Dec. 1, 2020, which claims priority to German Patent Application No. 10 2020 100 745.0 filed with the German Patent Office on Jan. 14, 2020, and German Patent Application No. 10 2020 100 744.2 filed with the German Patent Office on Jan. 14, 2020, the entirety of each of which is hereby incorporated by reference.

BACKGROUND

The invention relates to a diaphragm for a diaphragm valve, a valve body and a diaphragm valve.

It is known that diaphragms for diaphragm valves are subject to wear. Due to the reduced service life, this wear increases the maintenance and replacement cycles of the diaphragm.

It is therefore the object of the invention to reduce the wear on a diaphragm of a diaphragm valve and thereby increase the service life of the diaphragm.

SUMMARY OF THE INVENTION

The object of the invention is achieved by a diaphragm, by a valve body and by a diaphragm valve.

A first aspect of the description relates to a diaphragm for a diaphragm valve, the diaphragm having a functional region and a fastening portion which surrounds the functional region, the functional region in a relaxed state comprising: a central portion, which protrudes on a wet side of the diaphragm; a lateral portion, which protrudes on a dry side of the diaphragm, the lateral portion being curved, at least in parts, toward the dry side of the diaphragm; and an intermediate portion, which is arranged between the central portion and the lateral portion and is curved, at least in parts, toward the wet side of the diaphragm.

A gentle rolling or flexing of the functional region, in particular toward the outside, is made possible by the opposing curvature of the intermediate portion and the lateral portion. In addition, the relaxed state represents a relaxed intermediate position between an open and a closed position of the diaphragm. This reduces material stresses that occur during movement. In particular, this prevents the diaphragm from buckling during a positioning process. Buckling is prevented by reducing radial compression and radial expansion of the material. Rather, a material-friendly rolling or flexing movement of the diaphragm is made possible. The service life of the diaphragm is increased and at the same time the maintenance cycles are extended.

An advantageous example is characterized in that a diaphragm thickness decreases, at least in parts, toward the fastening portion in a region comprising the intermediate portion and the lateral portion.

The rolling or flexing movement of the diaphragm in the border region of the functional region of the diaphragm is advantageously supported by the reduction in thickness.

An advantageous example is characterized in that the intermediate portion follows, at least in parts, an arc of a circle having a first radius.

An advantageous example is characterized in that the lateral portion, at least in parts, follows an arc of a circle having a second radius and the second radius being smaller than the first radius.

This reduction in radius toward the outside causes the diaphragm to be forced into the flexing movement.

An advantageous example is characterized in that a ratio of the second radius to the first radius is between 0.40 and 0.85, in particular between 0.55 and 0.75.

This minimum dimension of the second radius forces the diaphragm into the desired flexing movement with the largest possible flexing radius in the region of the lateral portion. The lateral region is prevented from snapping over when the diaphragm is pulled off the valve seat.

An advantageous example is characterized in that the first radius is in a range greater than $1/10$th of a seat diameter, in particular in a range between $1/17$th and $1/5$th of the seat diameter, and in particular in a range between $1/11$th and $1/7$th of the seat diameter, follows.

The lateral region is thus matched to the seat diameter in such a way that the diaphragm is forced into a movement that does not fall below a minimum flexing radius of the lateral region, which radius depends on the material used and the thickness of the diaphragm. As a result, the stresses on the material of the diaphragm are reduced.

An advantageous example is characterized in that the relaxed state of the diaphragm corresponds to an unloaded intermediate position of the diaphragm, which is between an open position and a closed position.

Advantageously, the production in the unloaded intermediate position reduces the radial tensile and compressive forces occurring when the diaphragm is placed, which extends the service life of the diaphragm.

An advantageous example is characterized in that the central portion comprises a wet-side sealing ridge.

An advantageous example is characterized in that the sealing ridge is surrounded by two recesses in a section perpendicular to its course.

The sealing ridge exposed in this way improves the closing process.

An advantageous example is characterized in that a wet-side contour of the intermediate portion is configured rotationally symmetrically to a positioning axis, and the sealing ridge transitioning into the rotationally symmetrically configured wet-side contour.

Advantageously, on the one hand, a sufficient force can be exerted centrally on the sealing ridge of the valve body. On the other hand, the transition of the sealing ridge into the rotationally symmetrical intermediate portion allows the border fiber expansions to be reduced toward the lateral portion.

A second aspect of this description relates to a diaphragm valve comprising a diaphragm according to the first aspect, the diaphragm being braced between a valve body and a drive body.

An advantageous example is characterized in that a length of a longitudinal sectional contour of the functional region of the diaphragm is shorter, in particular between 1-4% shorter, in particular between 2-3% shorter, than a longitudinal sectional contour of the sealing ridge of the valve body.

This longitudinal sectional contour adjustment advantageously supports the minimum flexing radius in the lateral region of the functional region not being undershot.

An advantageous example is characterized in that the valve body comprises a fastening portion for the diaphragm, a sealing ridge for interaction with the functional region of the diaphragm being arranged within the fastening portion, a sealing contour of the sealing ridge of the valve body comprising two convexly curved contact portions in a longitudinal section of the sealing ridge, which portions each inwardly abut the fastening portion.

A third aspect of this description relates to a valve body for a diaphragm valve, the valve body comprising a fastening portion for a diaphragm, a sealing ridge for interacting with a functional region of the diaphragm being arranged within the fastening portion, a sealing contour of the sealing ridge comprising two convexly curved contact portions in a longitudinal section of the sealing ridge, which portions each inwardly abut the fastening portion.

The convex contact portion prevents the diaphragm from buckling during a movement. Rather, the contact portion causes the diaphragm to transition into a rolling or flexing movement, particularly when it is pulled away from the valve seat, thereby protecting the material of the diaphragm in the radially outer region. This puts less strain on the diaphragm. In addition, the proposed sealing contour allows the diaphragm to be pressed more evenly over the sealing contour. Consequently, the service life of the diaphragm is increased in several ways.

The seat geometry indeed delimits a smaller cross-sectional area compared to the prior art. However, the aforesaid rolling movement and the resulting reduction in diaphragm loading allow the valve lift to be increased. The increased valve lift even overcompensates for the smaller seat cross-sectional area in that the valve has a larger opening cross-portion than in the prior art. Accordingly, comparatively larger flow rates can be provided.

An advantageous example is characterized in that the convexly curved contact portion, at least in parts, follows an arc of a circle, the radius of which is in a range greater than $\frac{1}{10}$th of a seat diameter, in particular in a range between $\frac{1}{17}$th and $\frac{1}{5}$th of the seat diameter, and in particular in a range between $\frac{1}{11}$th and $\frac{1}{7}$th of the seat diameter.

This range of values for the radius of the convexly curved contact portion advantageously provides a seat contour that is gentle on the diaphragm and supports the rolling movement. A rolling or flexing radius in the longitudinal section of the diaphragm does not fall below a minimum during the movement of the diaphragm, which means that the diaphragm is not buckled, but rather the diaphragm—for example when the valve is opening-transitions into a rolling movement. The opening movement always puts a lot of strain on the diaphragm, because the contour of the pressure piece can only support this process to a limited extent. The radius selected for the convexly curved contact portion mitigates the aforementioned stress problem.

An advantageous example is characterized in that an imaginary tangent of the sealing contour at an inflection point forms an angle with a positioning axis in the range between 40° and 52°, in particular in a range between 44° and 50°, and in particular in a range between 47° and 49°.

This imaginary tangent advantageously provides a valve seat which, on the one hand, allows for an increased seat depth and, at the same time, still allows the diaphragm to be pressed sufficiently against the valve seat in order to keep the diaphragm valve securely closed.

An advantageous example is characterized in that the convexly curved contact portion perpendicular to a positioning axis takes up between $\frac{1}{20}$th and $\frac{1}{5}$th of the seat diameter of the sealing ridge, in particular between $\frac{1}{15}$th and $\frac{1}{6}$th of the seat diameter.

Advantageously, the convex contact portion thus protrudes far enough into the valve seat opening that the unrolling of the diaphragm is advantageously supported.

An advantageous example is characterized in that at least one contact portion of the sealing contour that is concavely curved in the longitudinal section of the sealing ridge inwardly abuts the corresponding convexly curved contact portion, the concavely curved portion being less curved than the convexly curved portion.

Advantageously, the convexly curved contact portion transitions into the concavely curved contact portion and thus allows the diaphragm to be pressed onto the sealing ridge seamlessly. The less pronounced curvature of the concavely curved portion ensures that a sufficiently large flow cross section is provided.

An advantageous example is characterized in that a center of curvature of the convexly curved portion and a center of curvature of the concavely curved portion lie on an imaginary common line, which forms an angle with the positioning axis in a range between 45° and 70°, in particular in a range between 65° and 50°.

A fifth aspect of this description relates to a diaphragm for a diaphragm valve, the diaphragm comprising a fastening portion, a functional region for interacting with a sealing ridge of a valve body being arranged within the fastening portion, a closing contour of the functional region formed in a closed state of the diaphragm comprising two concavely curved contact portions in a longitudinal section of the functional region, each of which inwardly abuts the fastening portion.

A sixth aspect of this description relates to a diaphragm valve comprising the valve body according to the first aspect and a diaphragm according to the second aspect.

An advantageous example of the diaphragm valve is characterized in that, when the diaphragm valve is in a closed state, the concavely curved contact portions of the diaphragm each abut the associated convexly curved contact portion of the valve body.

DETAILED DESCRIPTION

Figure 1:
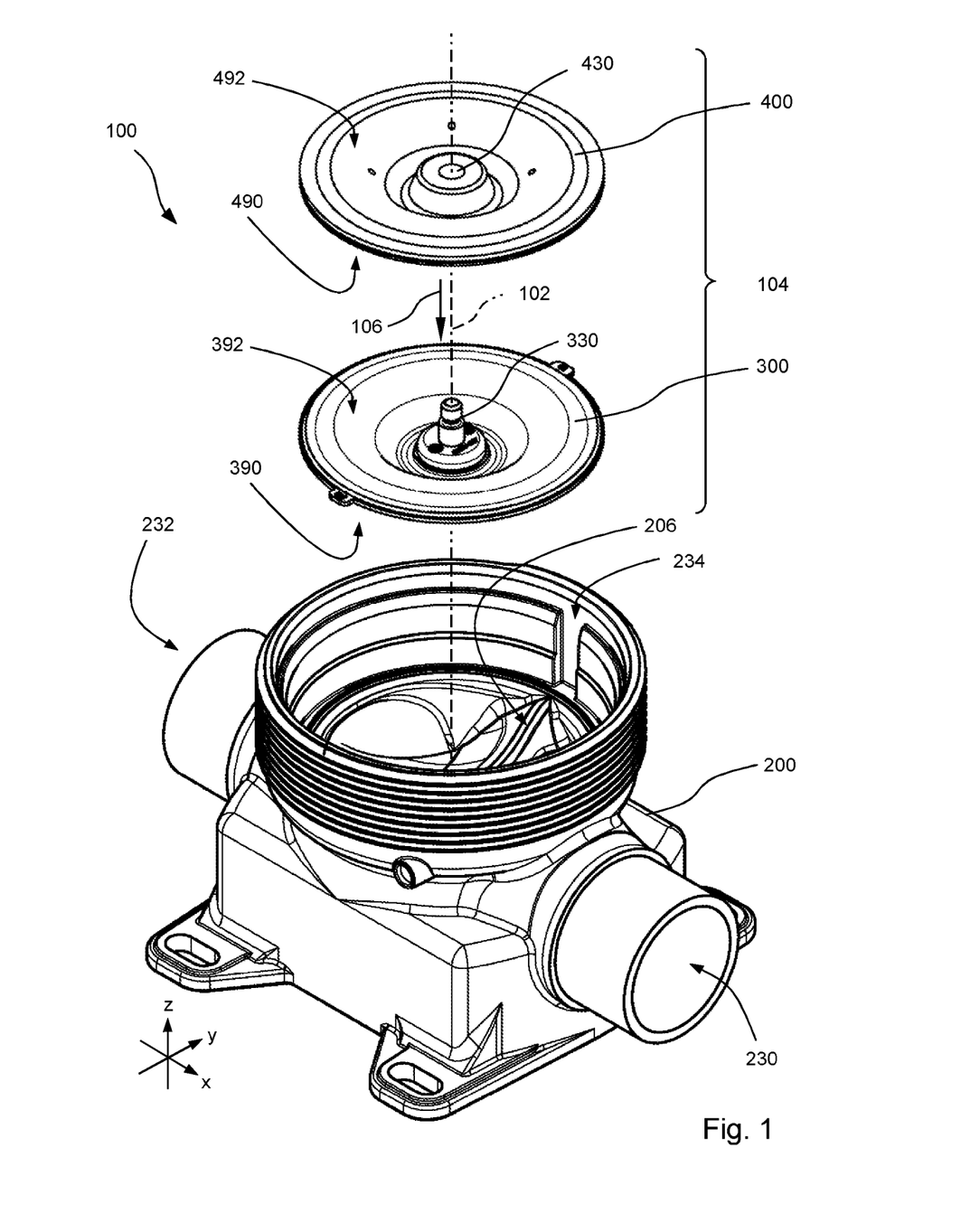
FIG. 1 shows a part of a diaphragm valve in an exploded view.

FIG. 1 shows a part of a diaphragm valve 100 in an exploded view. A valve body 200, a first diaphragm 300 and a second diaphragm 400 are shown along a positioning axis 102. The two diaphragms 300 and 400 form a two-part diaphragm arrangement 104, wherein the first diaphragm 300 can be designated as a diaphragm shield and the diaphragm 400 as a supporting diaphragm. The diaphragm 300, 400 comprises a wet side 390, 490 and a dry side 392, 492, the dry side 392, 492 facing away from the valve body 200, and the wet side 390, 490 facing the valve body 200.

In one example, the first diaphragm 300 comprises polytetrafluoroethylene, PTFE, or a perfluoroalkoxy polymer, PFA, and the second diaphragm 400 comprises an elastomer such as a vulcanized ethylene propylene diene rubber, EPDM. In another example, the materials are chosen differently. In a further example, only a single diaphragm comprising PTFE, PFA or EPDM is used.

A pin 330, which is fixedly connected to the first diaphragm 300, extends through a central opening 430 of the second diaphragm 400 and is connected to a valve rod (not shown). The valve rod is driven by a drive (not shown) in order to move the diaphragm 330 along the positioning axis 102.

The valve body 200 includes two process fluid connections 230, 232. A particular fluid channel leads from the corresponding process fluid connection 230, 232 to a sealing ridge 206, which is accessible via an opening 234 of the valve body 200.

The valve arrangement 104 is inserted into the opening 234 and clamped in a fluid-tight manner in a corresponding lateral fastening portion between the valve body 200 and a drive body. In an adjustment direction 106, the drive presses the diaphragm arrangement 104 onto the sealing ridge 206 in order to prevent a fluid flow between the fluid channels. When the diaphragm arrangement 104 is lifted off the sealing ridge 206, an opening cross section is unblocked, thereby allowing the fluid flow between the two fluid channels.

In the present case, the diaphragm arrangement 104 comprises two diaphragms 300, 400. The aspects disclosed in this description can of course also be transferred to diaphragm arrangements having a single diaphragm or more than two diaphragms.

Figure 2:
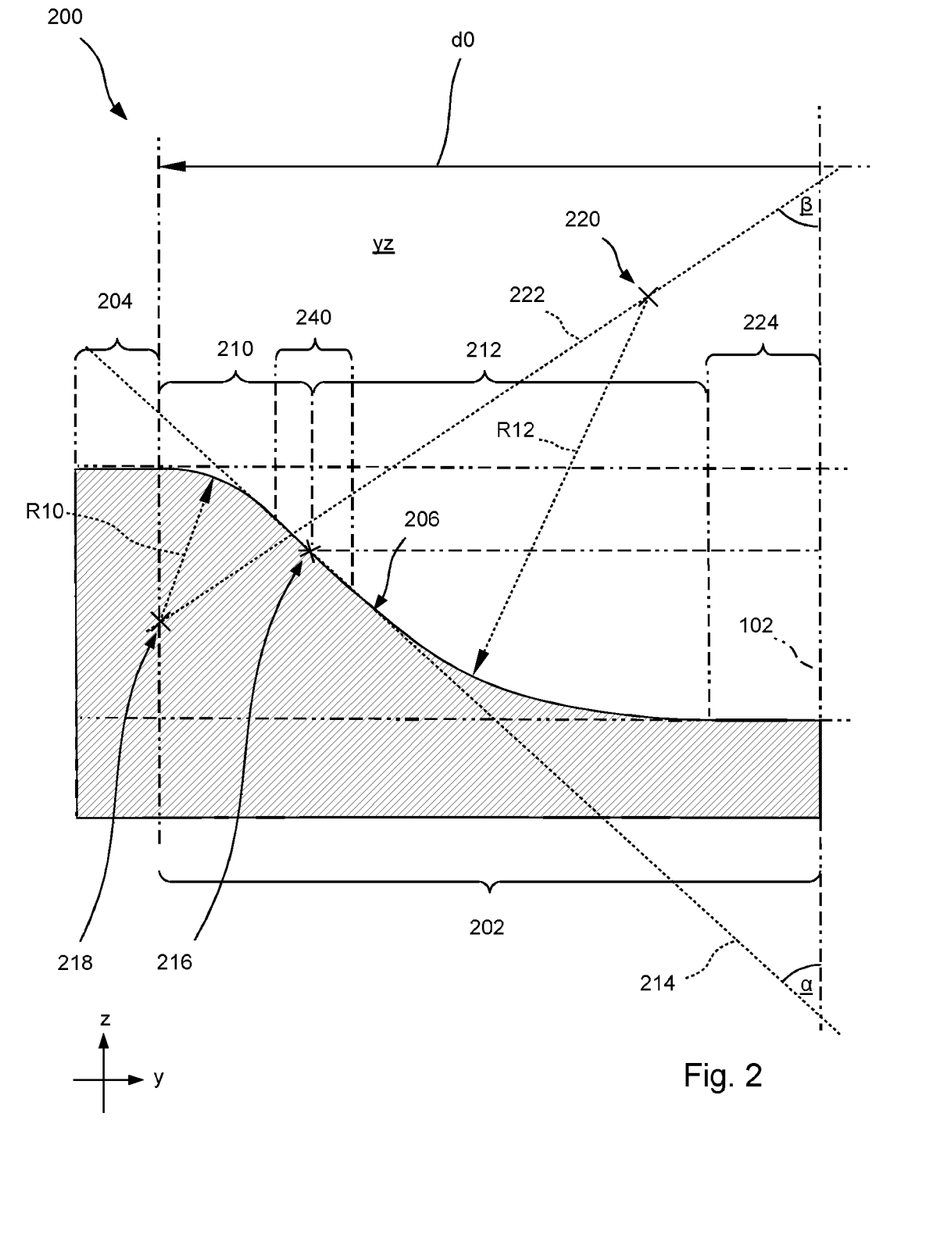
FIG. 2 is a schematic longitudinal section of a sealing ridge of a valve body.

FIG. 2 shows a schematic longitudinal section of sealing ridge 206 of the valve body 200. The sealing ridge 206 is constructed mirror-symmetrically to the positioning axis 102, which is why only one half of the valve body 200 is shown in FIG. 2.

The valve body 200 includes an outer fastening portion 204 for abutting the diaphragm 300 from FIG. 1 and for bracing the diaphragm arrangement 104 from FIG. 1. The sealing ridge 206 is arranged within the fastening portion 204 in order to interact with a functional region of the diaphragm 300, 400.

A sealing contour of the sealing ridge 206 comprises two contact portions 210 which are convexly curved in a longitudinal section yz of the sealing ridge 260 and each inwardly abut the associated fastening portion 204 toward the positioning axis 102. The sealing contour of the sealing ridge 206 runs along a surface of the sealing ridge 206 and relates to the longitudinal section yz of the sealing ridge 206.

The convexly curved contact portion 210 follows, at least in parts, an arc of a circle, the radius R10 of which is greater than 1/10th of a seat diameter d0 in a region, in particular in a region between 1/17th and 1/5th of the seat diameter d0, and in particular in a range between 1/11th and 1/7th of the seat diameter d0.

At an inflection point 216, an imaginary tangent 214 of the sealing contour forms an angle α with a positioning axis 102 in the range between 40° and 52°, in particular in a range between 44° and 50°, and in particular in a range between 47° and 49°. In a portion 240 around the inflection point 216, the sealing ridge 206 follows the tangent 214, whereby the portion 240 in section yz is within an imaginary truncated cone surface having the positioning axis 102 as the cone axis.

The convexly curved contact portion 210 takes up, perpendicular to the positioning axis 102, between 1/20th and 1/5th of the seat diameter d0 of the sealing ridge 206, in particular between 1/15th and 1/6th of the seat diameter d0.

Sealing ridge 206 comprises at least one contact portion 212 that is concavely curved in longitudinal section yz of sealing ridge 206. An inner region of the sealing contour of the sealing ridge 206, which contour comprises the at least one concavely curved contact portion 212, is surrounded by the two convexly curved contact portions 210. The concave contact portion 212 inwardly abuts the corresponding convexly curved contact portion 210 toward the positioning axis 102. In the present case, the sealing ridge 206 comprises a central, flat plateau portion 224. The plateau portion 224 can also be omitted, resulting in a single concavely curved contact portion 212. The concavely curved portion 212 is less curved than the convexly curved portion 210.

A center of curvature 218 of the convexly curved portion 210 and a center of curvature 220 of the concavely curved portion 212 lie on an imaginary common line 222. The line 222 forms an angle β with the positioning axis 102 in a range between 45° and 70°, in particular in a range between 65° and 50°.

The concave contact portion 212 follows, at least in parts, a circular path having a second radius R12, the first radius R10 being larger than one sixth of the second radius R12 and smaller than half the second radius R12, in particular larger than a quarter of the second radius R12 and smaller than half the second radius R12.

Figure 3:
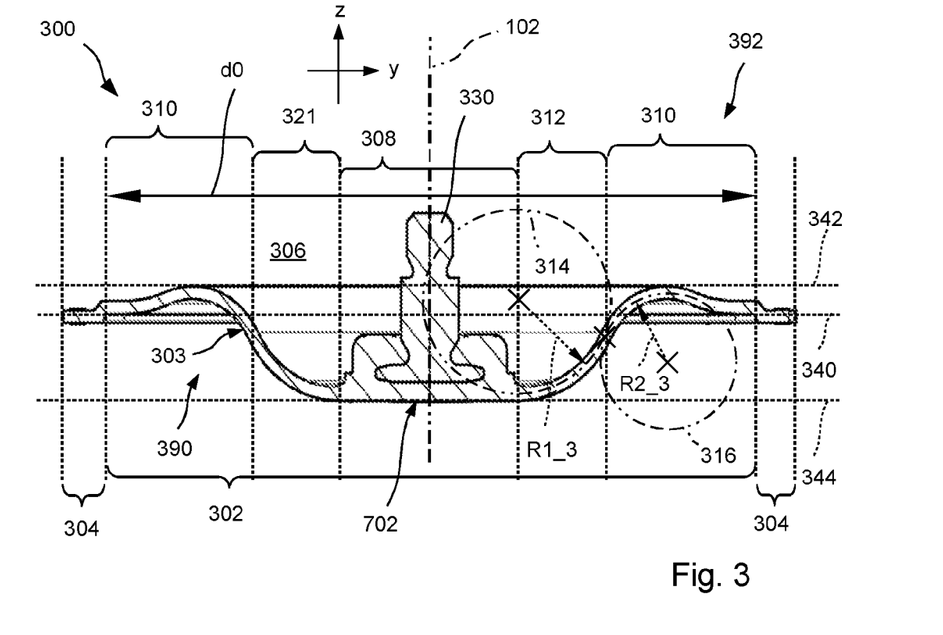
FIGS. 3 and 4 are each longitudinal sections of a diaphragm.
Figure 4:
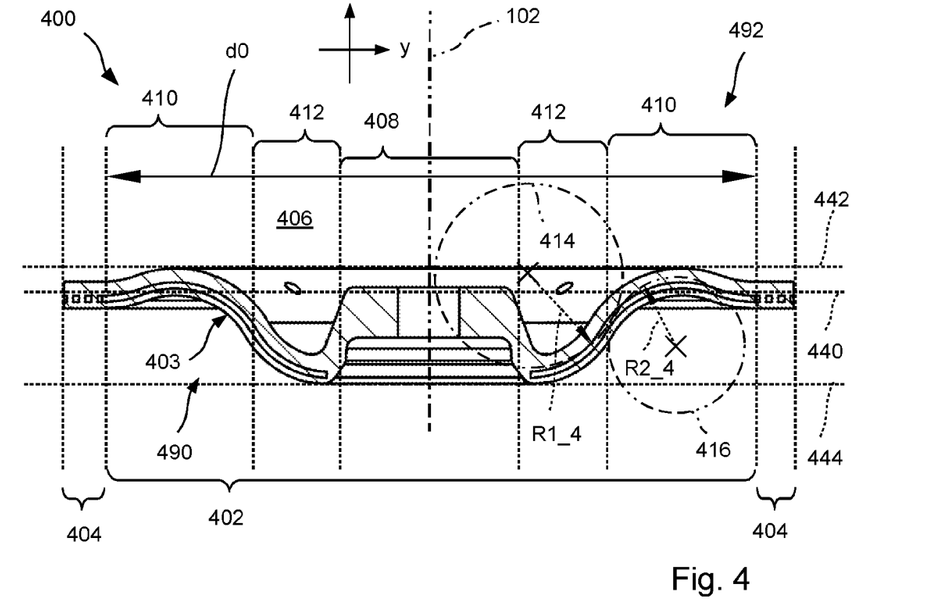

FIG. 3 shows a longitudinal section of the diaphragm 300, and FIG. 4 shows a longitudinal section of the diaphragm 400. Both diaphragms 400 are described together below.

The diaphragm 300, 400 comprises the functional region 302, 402 and a fastening portion 304, 404 surrounding the functional region 302, 402. The diaphragm 300, 400 is shown in a relaxed state, which means that no forces are being exerted on the diaphragm 300, 400. In particular in the relaxed state shown, the diaphragm 300, 400 is not clamped in a valve or connected to a drive.

The functional region 302, 402 in the relaxed state 306, 406 includes: A central portion 308, 408, which protrudes on the wet side 390, 490 of the diaphragm 300, 400; a lateral portion 310, 410, which protrudes on a dry side 392, 492 of the diaphragm 300, 400, the lateral portion 310, 410 being curved, at least in parts, toward the dry side 392, 492 of the diaphragm 300, 400; and an intermediate portion 312, 412 arranged between the central portion 308, 408 and the lateral portion 310, 410, which intermediate portion is curved, at least in parts, toward the wet side 390, 490 of the diaphragm 300, 400.

A first vertical plane 340, 440 of the positioning axis 102 runs through the fastening portion 304, 404. A second vertical plane 342, 442 of the positioning axis delimits the lateral portion 310, 410 from the outside. A third vertical plane 344, 444 delimits the central portion 308, 408 from the outside. The first vertical plane 340, 440 is located between the second vertical plane 342, 442 and the third vertical plane 344, 444.

A diaphragm thickness or wall thickness of the diaphragm 300, 400 decreases, at least in parts, in a region comprising the intermediate portion 312, 412 and the lateral portion 310, 410 toward the fastening portion 304, 404. In a further example, the diaphragm thickness or wall thickness of the diaphragm 300, 400 in the region comprising the intermediate portion 312, 412 and the lateral portion 310, 410 is selected to be essentially constant.

The intermediate portion 312, 412 follows, at least in parts, an arc of a circle 314, 414 having a first radius $R1\_3$, $R1\_4$. The lateral portion 310, 410 follows, at least in parts, an arc of a circle 316, 416 having a second radius $R2\_3$, $R2\_4$. The second radius $R2\_3$, $R2\_4$ is selected to be smaller than the first radius $R1\_3$, $R1\_4$. In particular, a ratio of the second radius $R2\_3$, $R2\_4$ to the first radius $R1\_3$, R1_4 is between 0.40 and 0.85, in particular between 0.55 and 0.75. The first radius R1_3, R1_4 is in a range greater than 1/10th of a seat diameter d0, in particular in a range between 1/17th and 1/5th of the seat diameter d0, and in particular in a range between 1/11th and 1/7th of the seat diameter d0.

Figure 5:
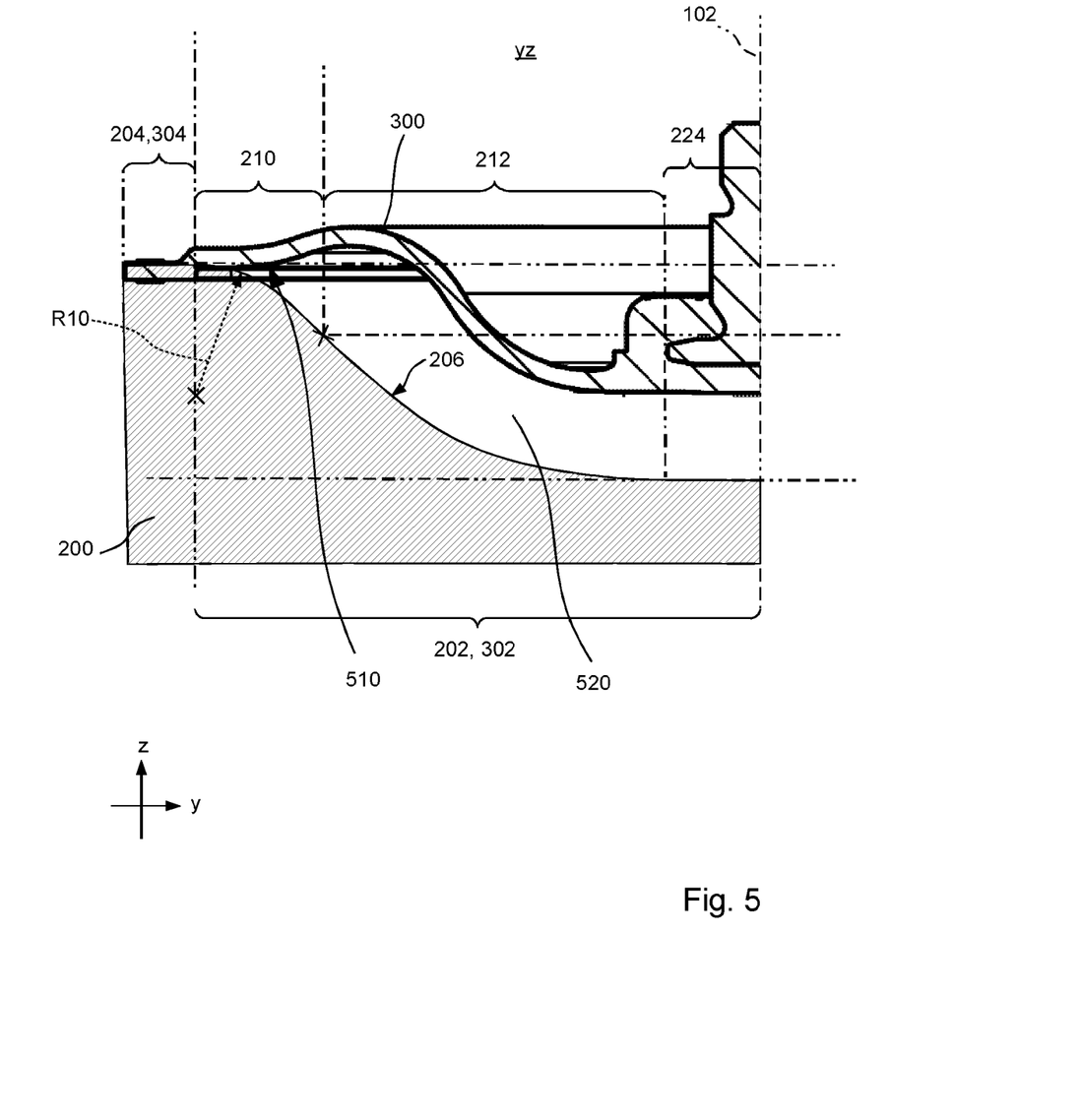
FIG. 5 shows a diaphragm and an associated valve body in a schematic section.

FIG. 5 shows the diaphragm 300 and the associated valve body 200 in a schematic section. The fastening portions 204 and 304 abut one another in a fluid-tight manner. The diaphragm 300 is shown schematically in the relaxed state. An opening cross section 520 results between the diaphragm 300 and the sealing ridge 206 through which the opening process fluid can flow.

If the diaphragm 300 is pressed onto the sealing ridge 206, this results in a closed contour of the functional region 302 formed in this closed state of the diaphragm 300, which contour has two contact portions 510 that are concavely curved in the longitudinal section yz of the functional region 302, and each of which inwardly abuts the fastening portion 304. The closing contour of the functional region 302 refers to a wet-side surface of the diaphragm 300, specifically in a longitudinal section xy of the associated sealing ridge 206. When the diaphragm valve 100 is in the closed state, the concavely curved contact portions 510 of the diaphragm 300 each abut the associated convexly curved contact portion 210 of the valve body 200.

A length of a longitudinal sectional contour of functional region 302, 402 of diaphragm 300, 400 from FIG. 3 or 4 is shorter, in particular between 1-4% shorter, in particular between 2-3% shorter, than a longitudinal sectional contour of sealing ridge 206 of valve body 200. The longitudinal section contour refers to a wet-side surface of the diaphragm 300, 400, specifically in the longitudinal section of the associated sealing ridge 206.

Figure 6:
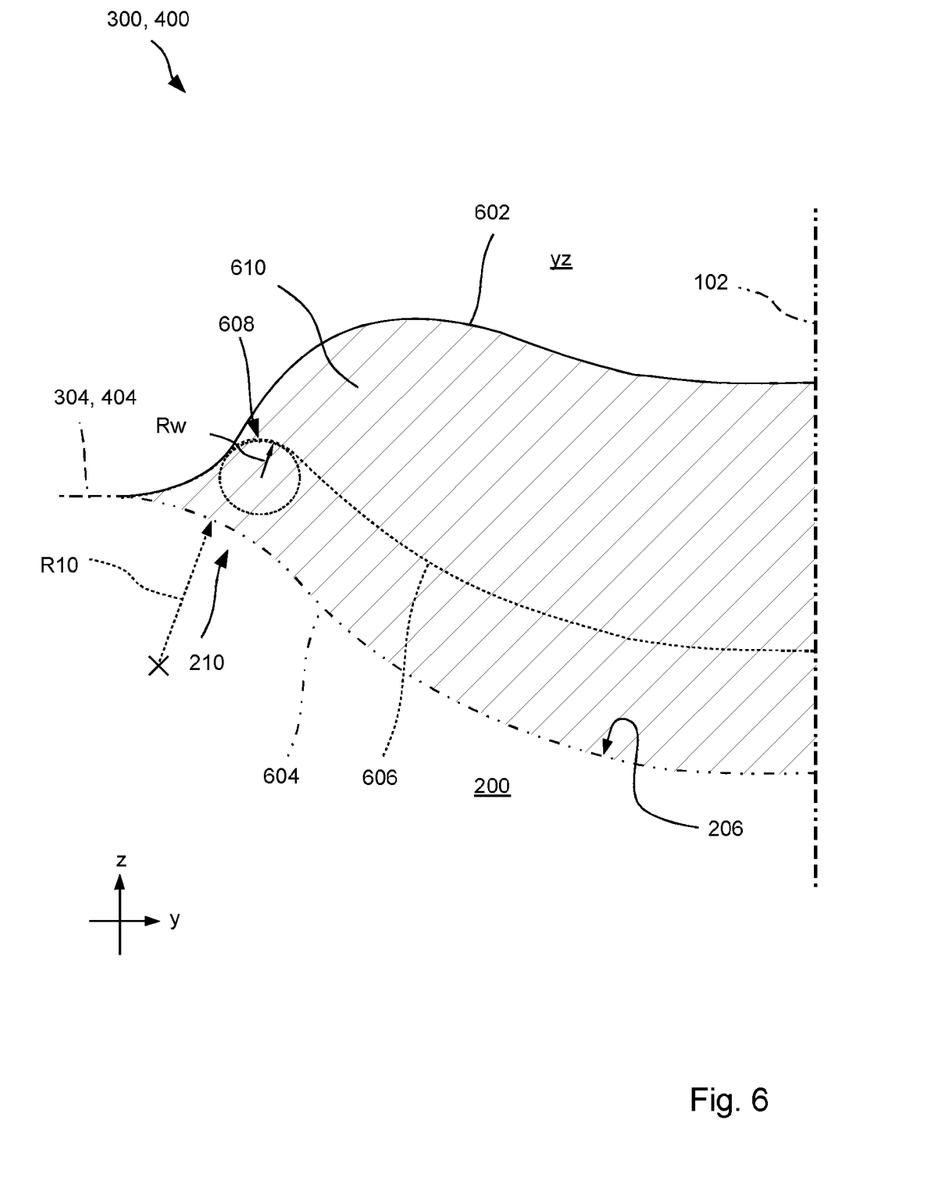
FIG. 6 shows various positions of the diaphragm in schematic form.

FIG. 6 shows various positions of the diaphragm in schematic form in section yz. The relaxed state 306, 406 of the diaphragm 300, 400 from FIGS. 3 and 4, which is not shown in FIG. 6, corresponds to an unloaded intermediate position of the diaphragm 300, 400, which is located between an open position 602 and a closed position 604. A maximum opening cross section 610 results between the open position 602 and the closed position 604.

The shown position 606 of the diaphragm 300, 400 is reached when the diaphragm 300, 400 is lifted off the sealing ridge 206 and is moved toward the open position 602. Due to the configuration of the diaphragm 300, 400 explained in this description, a lateral curvature 608 is reached in the position 606 in a section which comprises the positioning axis 102. The bulge 608 opens toward the corresponding wet side. The curvature 608 comprises a minimum flexing radius Rw, which is not fallen below when passing through the positions going from the position 604 to the position 602.

Figure 7:
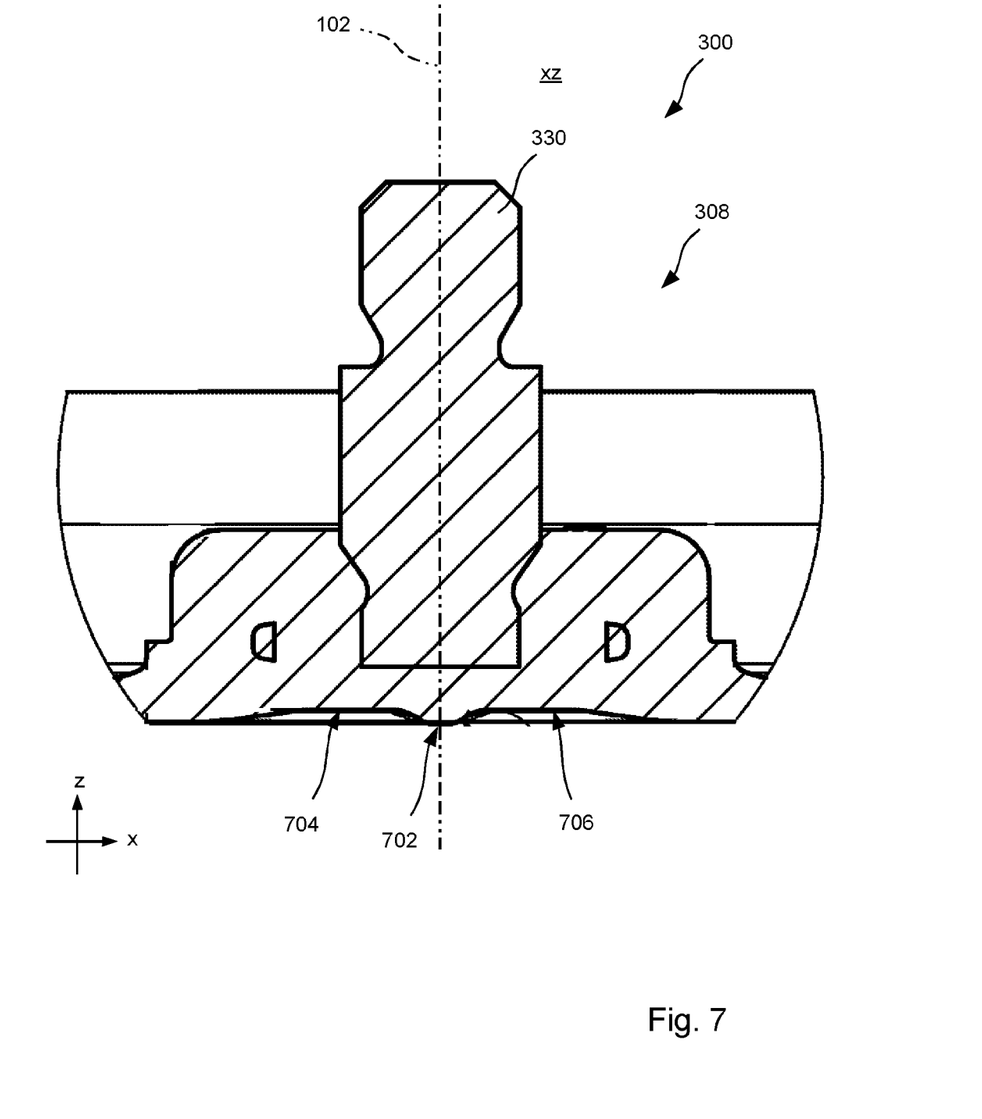
FIG. 7 is a schematic cross section of a central portion of the diaphragm.

FIG. 7 shows a schematic cross section of the central portion of the diaphragm 300. The central portion 308 comprises a wet-side sealing ridge 702. The sealing ridge 702 is surrounded by two recesses 704, 706 in a section xz perpendicular to the course of the sealing ridge 702.

In an alternative example, the sealing ridge 702 and the corresponding recesses 704, 706 are omitted. In this example, a wet-side surface of the central portion 308 is rotationally symmetrical to the positioning axis 108.

Figure 8:
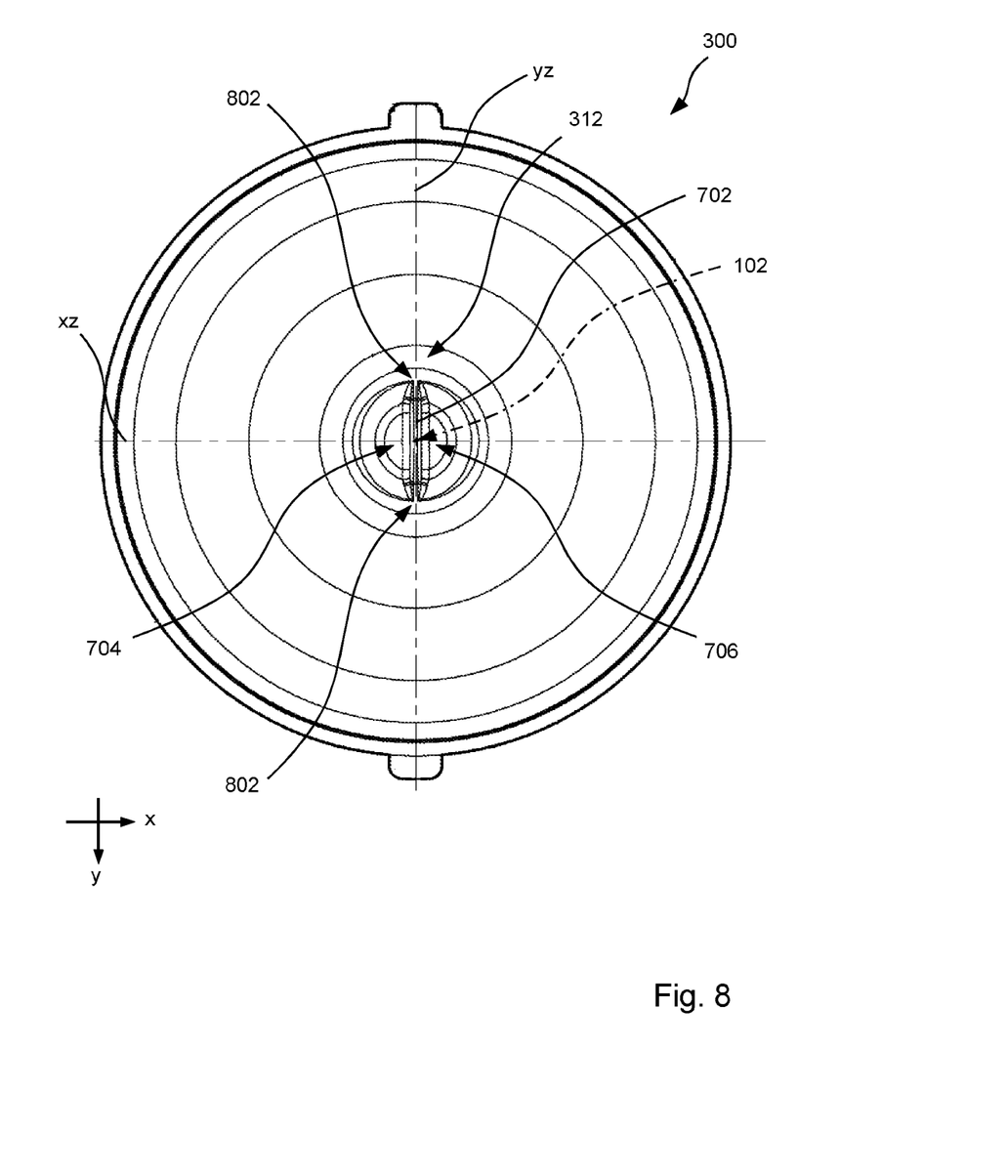
FIG. 8 is a view of a wet side of the diaphragm.

FIG. 8 shows a view of the wet side of diaphragm 300 in the z-direction. The diaphragm 300 comprises a wet-side surface contour of the intermediate portion 312, which contour is designed to be rotationally symmetrical to the positioning axis 102. In regions 802 and 804, the sealing ridge 702 continuously transitions into the rotationally symmetrical wet-side surface contour of the intermediate portion 312.

The invention claimed is:

1. A diaphragm valve comprising a valve body, a drive body and a diaphragm, wherein the diaphragm is braced between the valve body and the drive body, and wherein the diaphragm has a functional region and a fastening portion surrounding the functional region, the functional region in a relaxed state comprising:
   a. a central portion, which protrudes on a wet side of the diaphragm, wherein the central portion comprises a wet-side sealing web, and wherein the sealing web is surrounded by two recesses in a section view perpendicular to its longitudinal extension;
   b. a lateral portion, which protrudes on a dry side of the diaphragm, the lateral portion being curved, at least in parts, toward the dry side of the diaphragm; and
   c. an intermediate portion arranged between the central portion and the lateral portion, which is curved, at least in parts, toward the wet side of the diaphragm, wherein a wet-side surface of the intermediate portion is rotationally symmetrical to the positioning axis, wherein the intermediate portion, at least in parts, follows an arc of a circle having a first radius, wherein the lateral portion, at least in parts, follows an arc having a second radius, and wherein the second radius is smaller than the first radius, wherein a ratio of the second radius to the first radius is between 0.40 and 0.85.

2. The diaphragm valve according to claim 1, wherein the valve body comprises a fastening portion for the diaphragm, a sealing web for cooperation with the functional region of the diaphragm being arranged within the fastening portion of the diaphragm, a sealing contour of the sealing web of the valve body comprising two contact portions which are convexly curved in a longitudinal section of the sealing web and each inwardly abut the fastening portion.

3. The diaphragm according to claim 1, wherein the first radius is in a range greater than 1/10th of a seat diameter.

4. The diaphragm according to claim 1, wherein the relaxed state of the diaphragm corresponds to an unloaded intermediate position of the diaphragm, which is between an open position and a closed position.

5. The diaphragm according to claim 1, wherein a wet-side contour of the intermediate portion is rotationally symmetrical to a positioning axis, and wherein the sealing web transitions into the rotationally symmetrical wet-side contour.

* * * * *